US005700578A

United States Patent [19]
Korney, Jr. et al.

[11] Patent Number: 5,700,578
[45] Date of Patent: Dec. 23, 1997

[54] FLUOROPOLYMER/TERPOLYMER COMPOSITE

[75] Inventors: Arthur F. Korney, Jr., Pickerington; Earl H. Sexton, III; Winnie Young, both of Columbus, all of Ohio

[73] Assignee: Crane Plastics Company Limited Partnership, Columbus, Ohio

[21] Appl. No.: 494,378

[22] Filed: Jun. 26, 1995

[51] Int. Cl.$^6$ .......................... B32B 27/30; B32B 15/08
[52] U.S. Cl. .......................... 428/421; 428/462; 428/463; 428/512; 428/514; 428/519; 428/520
[58] Field of Search .................... 428/421, 422, 428/461, 511, 513, 514, 521, 522, 462, 518, 519, 520, 512, 463; 525/199, 200, 198

[56] References Cited

U.S. PATENT DOCUMENTS

| | | | |
|---|---|---|---|
| 3,253,060 | 5/1966 | Koblitz et al. | 260/900 |
| 3,458,391 | 7/1969 | Miller | 161/189 |
| 3,524,906 | 8/1970 | Schmitt et al. | 260/900 |
| 3,769,371 | 10/1973 | Nersasian | 260/900 |
| 3,779,976 | 12/1973 | Marsico et al. | 260/900 |
| 3,895,029 | 7/1975 | Ward | 260/31.4 |
| 3,944,689 | 3/1976 | Luckock et al. | 427/385 |
| 4,123,401 | 10/1978 | Berghmans et al. | 260/29.6 |
| 4,221,757 | 9/1980 | Strassel | 264/171 |
| 4,226,904 | 10/1980 | Ollivier et al. | 428/212 |
| 4,281,492 | 8/1981 | Schock et al. | 52/309.9 |
| 4,291,099 | 9/1981 | Strassel | 428/421 |
| 4,364,886 | 12/1982 | Strassel | 264/171 |
| 4,404,247 | 9/1983 | Dominquez et al. | 428/213 |
| 4,424,292 | 1/1984 | Ravinovitch et al. | 524/88 |
| 4,557,977 | 12/1985 | Memmer et al. | 428/421 |
| 4,581,412 | 4/1986 | Ohmori et al. | 525/199 |
| 4,585,701 | 4/1986 | Bartoszek et al. | 428/421 |
| 4,728,677 | 3/1988 | Bartoszek et al. | 428/421 |
| 4,776,913 | 10/1988 | Goossens et al. | 156/230 |
| 4,824,911 | 4/1989 | Chu | 525/199 |
| 4,877,839 | 10/1989 | Conti-Ramsden et al. | 525/200 |
| 4,927,675 | 5/1990 | Adams et al. | 428/35.9 |
| 5,118,579 | 6/1992 | Aharoni et al. | 428/422 |
| 5,229,460 | 7/1993 | Yousuf et al. | 428/422 |

*Primary Examiner*—Rena Dye
*Attorney, Agent, or Firm*—Standley & Gilcrest

[57] ABSTRACT

The present invention in broadest terms includes plastic composites comprising at least two layers comprising: (1) a first layer comprising a polymeric blend comprising at least one fluoropolymer and at least one polymeric material selected from the group consisting of terpolymers; and (2) at least one substrate material.

17 Claims, No Drawings

FLUOROPOLYMER/TERPOLYMER COMPOSITE

TECHNICAL FIELD

The present invention is in the field of polymer alloys and composite materials produced therefrom. The present invention is a fluoropolymer-terpolymer plastic alloy, composites made therefrom and method for producing them.

BACKGROUND

In the field of polymer alloys and composite materials, it is often necessary or desirable to produce materials that have both advantageous physical properties such as tensile strength and impact resistance, while being resistant to environmental degradation, such as through exposure to sunlight. It is often difficult to produce such alloys that may also be attached to a substrate material to form a composite material. It is also difficult to balance these properties in order to produce an alloy or composite best suited for the desired application.

Plastic composites have a wide variety of applications, particularly in the building and automotive fields. These composites can find use in seals, liners and gaskets for doors, windows and building or assembly sections. They may also be used on substrates to produce building materials, such as door and window frames, moldings and building panels. In these uses, it is important that the particular composite have and maintain the appropriate characteristics (hardness, strength, flexibility, expansion, and dimensional characteristics).

Such applications usually involve outdoor use or other exposure to environments which accelerate polymer degradation. Polymer degradation can cause loss in color, stability, flexibility and/or strength. Sunlight or other light sources can break down polymers as can exposure to water- or air-borne caustic materials, such as acids, salts, and organic solvents. Accordingly, it is desirable to be able to produce plastic composites that will have the desired strength, flexibility, expansion and dimensional stability characteristics, while being resistant to the degrading aspects of its application environment.

The development of fluoropolymers greatly increased the resistance to degradation for polymers containing them. Examples of such fluoropolymers are found in U.S. Pat. Nos. 3,253,060 to Koblitz et al., 3,458,391 to Miller, 3,523,906 to Schmitt et al., 3,769,371 to Netsasian, 3,779,976 to De Marisco et at., 3,895,029 to Ward, 3,944,689 to Luckock et al., 4,123,401 to Berghmans et al., 4,221,757 to Strassel, 4,226,904 to Ollivier et al, 4,281,492 to Schock et al., 4,291,099 to Strassel, 4,364,886 to Strassel, 4,404,247 to Dominguez-Burguette et al., 4,415,519 to Strassel, 4,424,292 to Rabinovitch, 4,557,977 to Memmer et al., 4,581,412 to Ohmori et al, 4,585,701 to Bartoszek et al., 4,728,677 to Lacatus et al, 4,776,913 to Goossens et al, 4,824,911 to Chu, 4,877,839 to Conti-Ramsden et al., 4,927,675 to Adams et al., all of which are hereby incorporated herein by reference. However, fluoropolymers are relatively expensive when compared to non-fluoropolymers such as acrylic polymers and polyvinylchlorides. Thus it is desirable to produce a polymer composite which will yield the advantages of fluoropolymers while minimizing the total fluoropolymer content so that a polymeric material can be made cost effective for a wide variety of uses, particularly in the areas described above.

The present invention is an improvement over the alloys and composites disclosed in U.S. Pat. No. 5,284,710, hereby incorporated herein by reference. The fluoropolymer alloys described in U.S. Pat. No. 5,284,710 show excellent weathering color retention performance. However, it has been observed that outdoor exposure leads to a reduction in physical properties of these materials.

Other advantages and benefits of the present invention will be apparent to one of ordinary skill in light of the present disclosure and the practice of the invention.

SUMMARY OF THE INVENTION

The present invention in broadest terms includes plastic composites comprising at least two layers comprising: (1) a first layer, preferably the outer layer, comprising a polymeric blend comprising at least one fluoropolymer (FP) and at least one polymeric material selected from the group consisting of terpolymers; and (2) at least one substrate material. It is preferred that the first layer contain only fluoropolymers and terpolymers, most preferably consisting essentially of fluoropolymers and terpolymers.

It is preferred that the ratio of the total fluoropolymer(s) to the total terpolymer(s) is in the range of about 10% to about 80% by weight; most preferably in the range of about 10% to about 50% by weight.

The fluoropolymer used in accordance with the present invention may be selected from any fluoropolymer, but is preferably polyvinylidine fluoride.

The terpolymer(s) used in accordance with the invention may be selected from any blended or unblended terpolymer. The terpolymer(s) used in the invention may be selected from one or more of the following: acrylonitrile-styrene-acrylic (ASA) terpolymers, acrylonitrile-ethylene-styrene (AES) terpolymers, and mixtures thereof. The preferred of these are unblended acrylonitrile-styrene-acrylic terpolymers and unblended acrylonitrile-ethylene-styrene terpolymers. An example of a blended terpolymer is a terpolymer-polyvinyl chloride blend.

Organic and inorganic pigments and dyes may be used in the present invention and may be any appropriate pigment that can be incorporated into the first polymeric substance, and may be selected for the particular performance and color results. Inorganic pigments are preferred. Several of these pigments are well known in the art. Examples include commercially available pigments such as Shepherd Blue #3, Shepherd Green #151, Drakenfeld Brown #10363, Drakenfeld Yellow #10401, Englehard Blue #7540 and Englehard Yellow #7730. The preferred range of the total pigment concentration used in the present invention is greater than about three percent by weight of the first polymeric substance.

The substrate(s) used in the composite of the present invention may include any of a variety of materials, used alone or in combination, such thermoplastic materials, such as polyvinyl chloride or post-chlorinated polyvinyl chloride (CPVC). Other suitable substrate materials include filled or reinforced thermoplastics. Other substrates include wood, metal, pultrusion materials and thermoplastic materials. The selection of substrate material may be guided by the intended application, cost, ease of manufacture, etc.

The plastic composite of the present invention may be made such that substrate material(s) comprise(s) an extrudable thermoplastic material, and wherein said plastic composite is formed by coextension with the first layer. The plastic composite may also be such that the first layer and the substrate material(s) is/are preformed, and the plastic composite is formed by lamination.

The present invention may be viewed as a replacement of the acrylic portion of a fluoropolymer/acrylic composite, such as that described in U.S. Pat. No. 5,284,710, with one or more terpolymers as described herein.

The present invention also includes a method of producing a fluoropolymer-terpolymer alloy composite. The method of the present invention generally involves coextruding a first layer onto a substrate as described above, so as to form a composite. Composites may also be formed by lamination.

DETAILED DESCRIPTION OF THE PREFERRED EMBODIMENT

In accordance with the foregoing summary, the following presents a detailed description of the preferred embodiments of the present invention which are considered to be the best mode.

The following table shows comparative impact and color retention in weather or un-weathered alloy formulations both of the prior art and the present invention.

Use of a fluoropolymer/acrylic blend (such as the FP/VS100 shown below) exhibited a significant loss of initial impact strength and ductility with acrylic loadings greater than 60%. Under xenon exposure, these materials also showed a loss of impact strength and ductility.

In comparison, the FP/Geloy® 1220 ASA/PVC composite showed improved initial impact strength and ductility with Geloy® loadings up to 80%. Following xenon exposure, these composites showed increased color change with Geloy® loadings greater than 50%. However, xenon-exposed materials showed improved impact strength and ductility retention with Geloy® loadings as high as 80%.

In another embodiment, alloys prepared with BASF Luran®-S 797SE UV ASA showed improved initial impact strength and ductility with Luran®-S loadings up to 80%, as compared to the acrylic-containing samples. Following xenon exposure, these alloys showed color change performance comparable to the acrylic-containing materials. Improved impact strength and ductility retention were also found with Luran®-S loadings up to 80% following xenon exposure.

The data presented herein suggests that the use of ASA or ASA/PVC materials in fluoropolymer alloys enhance the initial and weathered impact performance of fluoropolymer alloys.

The following table shows comparative weathering and impact parameters for alloy formulations:

| Xenon Exposure Study | Color | | | VHIT | VHIT % |
|---|---|---|---|---|---|
| Unexposed Samples | L | a | b | | |
| FP/VS100 50:50 | 39.97 | 0.57 | 8.51 | 2.98 D | |
| FP/VS100 40:60 | 39.72 | 0.61 | 4.34 | 3.16 D | |
| FP/VS100 20:80 | 39.34 | 0.60 | 4.24 | 0.38 B | |

-continued

| Xenon Exposure Study | Color | | | | VHIT | VHIT % |
|---|---|---|---|---|---|---|
| Xenon Samples | ΔL | Δa | Δb | ΔE | | |
| FP/VS100 50:50 | −0.37 | 0.08 | 0.12 | 0.40 | 3.2 D | 107 |
| FP/VS100 40:60 | −0.50 | 0.07 | 0.19 | 0.54 | 2.1 B | 66 |
| FP/VS100 20:80 | −0.53 | 0.05 | 0.14 | 0.55 | 0.4 B | |
| Unexposed Samples | L | a | b | | | |
| FP Geloy® 1220 50:50 | 39.48 | 0.65 | 4.42 | | 2.01 D | |
| FP/Geloy® 1220 40:60 | 39.31 | 0.61 | 4.27 | | 2.86 DB | |
| FP/Geloy® 1220 20:80 | 39.78 | 0.61 | 4.09 | | 3.05 D | |
| Xenon Samples | ΔL | Δa | Δb | ΔE | | |
| FP/Geloy® 1220 50:50 | 0.09 | −0.06 | −0.09 | 0.14 | 2.8 D | 100+ |
| FP/Geloy® 1220 40:60 | 1.19 | −0.03 | 0.06 | 1.19 | 2.8 D | 97 |
| FP/Geloy® 1220 20:80 | 2.64 | −0.04 | 0.07 | 2.64 | 2.9 D | 94 |
| Unexposed Samples | L | a | b | | | |
| FP/Luran® S797 50:50 | 40.76 | 0.64 | 4.50 | | 2.67 D | |
| FP/Luran® S797 40:60 | 40.60 | 0.68 | 4.36 | | 2.79 D | |
| FP/Luran® S797 20:80 | 40.60 | 0.73 | 4.06 | | 2.67 D | |
| Xenon Samples | ΔL | Δa | Δb | ΔE | | |
| FP/Luran® S797 50:50 | −0.03 | 0.04 | 0.21 | 0.22 | 2.7 D | 100 |
| FP/Luran® S797 40:60 | −0.08 | 0.03 | 0.26 | 0.27 | 2.7 D | 100 |
| FP/Luran® S797 20:80 | −0.10 | 0.02 | 0.24 | 0.26 | 2.6 D | 97 |

FP indicates fluoropolymer
VS 100 is an acrylic material, commercially available from Rohm & Haas Company
Geloy® 1220 is an ASA/PVC alloy, commercially available from General Electric Co.
Luran® S797 is a terpolymer material, commercially available from BASF Corporation
L is a lightness/darkness index
a is a red/green index
b is a blue/yellow index
D means ductile as defined in ASTM D-4226
B means brittle as defined in ASTM D-4226
E is an index representing the collective values of a, b and L
VHIT means variable height impact test The following table shows formulations of the present invention, as compared to PVDF/acrylic formulations. These results show that the use of a PVDF/terpolymer blend gave better results after exposure to weathering while having comparable initial impact qualities.

| Sample | 50% PVDF/ 50% Acrylic | 40% PVDF/ 60% Acrylic | 20% PVDF/ 80% Acrylic | 50% PVDF/ 50% Terp. | 40% PVDF/ 60% Terp. | 20% PVDF/ 80% Terp. |
|---|---|---|---|---|---|---|
| Initial Impact (in-lbs/ml) (ASTM D-2244) Xenon Exposure | 3.0 Ductile | 3.2 Ductile | 0.4 Brittle | 2.7 Ductile | 2.8 Ductile | 2.7 Ductile |

-continued

| Sample | 50% PVDF/ 50% Acrylic | 40% PVDF/ 60% Acrylic | 20% PVDF/ 80% Acrylic | 50% PVDF/ 50% Terp. | 40% PVDF/ 60% Terp. | 20% PVDF/ 80% Terp. |
|---|---|---|---|---|---|---|
| ΔE Color Change (ASTM D-2244, Hunter Lab) | 0.4 | 0.5 | 0.6 | 0.2 | 0.3 | 0.3 |
| Impact (in-lbs/ml) (ASTM D-2244) | 3.2 Ductile | 2.1 Brittle | 0.4 Brittle | 2.7 Ductile | 2.7 Ductile | 2.6 Ductile |

Color readings and impact tests were conducted using FP50/ASA pigmented blends using Geloy® 1220 and Luran®S797 compared to VS100 blends, in both unexposed and exposed states.

The following table gives the results.

| | Qualitative Comment Following Xenon Exposure |
|---|---|
| FP50/VS100 Blend Ratio | |
| 50:50 | Insignificant color change with comparable impact qualities |
| 40:60 | Insignificant color change with decrease in impact qualities |
| 20:80 | Insignificant color change |
| FP50/Geloy ® 1220 Blend Ratio | |
| 50:50 | Insignificant color change and slightly better impact qualities |
| 40:60 | Slightly lighter with comparable impact qualities |
| 20:80 | Lighter with comparable impact qualities |
| FP50/Luran ® S797 Blend Ratio | |
| 50:50 | Insignificant color change with comparable impact qualities |
| 40:60 | Insignificant color change with comparable impact qualities |
| 20:80 | Insignificant color change with comparable impact qualities |

Polymeric formulations of the present invention may be extruded or laminated, with extrusion being the preferred method of rendering them. Composites of the present invention may be produced through co-extrusion or lamination of the alloys of the present invention onto wood, wood composite, metal or polymer substrates, including extruded and pultruded materials, using equipment and practices familiar to those skilled in the art. The invention is not limited to any number of total layers in a plastic composite in accordance with the present invention, nor is the invention limited to any range of size or thickness of such layers. Typically and preferably, the first layer will be the outermost layer.

In light of the foregoing disclosure, it will be obvious to make alterations, variations and modifications to the present invention such as by the substitution of equivalent materials, arrangements and process steps, without departing from its spirit.

What is claimed is:

1. A plastic composite comprising at least two layers comprising:

(1) a first layer comprising a polymeric blend comprising at least one fluoropolymer and at least one polymeric material selected from the group consisting of (a) acrylonitrile-styrene-acrylic terpolymers, acrylonitrile-ethylene styrene terpolymers, ethylene-vinyl-acetate terpolymers, mixtures thereof, and (b) terpolymer-polyvinyl chloride blends; and (2) at least one substrate material.

2. A plastic composite according to claim 1 wherein the ratio of said at least one fluoropolymer to said at least one terpolymer in said polymeric material is in the range of about 10% to about 80% by weight.

3. A plastic composite according to claim 1 wherein the ratio of said at least one fluoropolymer to said at least one terpolymer in said polymeric material is in the range of about 10% to about 30% by weight.

4. A plastic composite according to claim 1 wherein said fluoropolymer is polyvinylidine fluoride.

5. A plastic composite according to claim 1 wherein said at least one substrate material comprises a thermoplastic material.

6. A plastic composite according to claim 5 wherein said thermoplastic material comprises polyvinyl chloride or chlorinated polyvinyl chloride.

7. A plastic composite according to claim 1 wherein said at least one substrate material comprises a reinforced thermoplastic material.

8. A plastic composite according to claim 1 wherein said at least one substrate material is selected from the group consisting of wood, metal, pultruded materials and thermoplastic materials.

9. A plastic composite according to claim 1 wherein at least one substrate material comprises an extrudable thermoplastic material, and wherein said plastic composite is formed by coextrusion.

10. A plastic composite according to claim 1 wherein said first layer and said at least one substrate material are preformed, and said plastic composite is formed by lamination.

11. A plastic composite comprising at least two layers comprising:

(1) a first layer comprising a polymeric blend comprising at least one fluoropolymer and at least one polymeric material selected from the group consisting of acrylonitrile-styrene-acrylic terpolymers, acrylonitrile-ethylene-styrene terpolymers, and mixtures thereof;

(2) at least one substrate material selected from the group consisting of wood, metal, pultruded materials, and thermoplastic materials.

12. A plastic composite according to claim 11 wherein the ratio of said at least one fluoropolymer to said at least one terpolymer in said polymeric material is in the range of about 10% to about 80% by weight.

13. A plastic composite according to claim 11 wherein the ratio of said at least one fluoropolymer to said at least one terpolymer in said polymeric material is in the range of about 10% to about 30% by weight.

14. A plastic composite according to claim 11 wherein said fluoropolymer is polyvinylidine fluoride.

15. A plastic composite according to claim 11 wherein said at least one terpolymer comprises a terpolymer-polyvinyl chloride blend.

16. A plastic composite according to claim 11 wherein said at least one substrate material comprises a thermoplastic material.

17. A plastic composite according to claim 16 wherein said thermoplastic material comprises polyvinyl chloride or chlorinated polyvinyl chloride.

* * * * *